United States Patent Office 3,524,821

Patented Aug. 18, 1970

3,524,821

REGENERATING OF CHROMIUM OXIDE CONTAINING DEHYDROGENATION CATALYSTS

Ludo K. Frevel, Midland, Mich., assignor to The Dow Chemical Company, Midland, Mich., a corporation of Delaware No Drawing. Filed Apr. 26, 1967, Ser. No. 633,711
Int. Cl. B01j *11/64, 11/04*
U.S. Cl. 252—416 7 Claims

ABSTRACT OF THE DISCLOSURE

The content of $Cr_2O_3$ in catalysts is maintained at a desired level by adding aqueous $H_2CrO_4$ to a gaseous catalyst regeneration stream. This procedure is particularly useful for replenishing the chromium oxide lost as $CrO_3$ during regeneration of dehydrogenation catalysts.

This invention relates to a process of maintaining the chromium oxide content of catalysts as $Cr_2O_3$ by feeding $H_2CrO_4$ into a gaseous catalyst-regenerating stream and more particularly pertains to a method of maintaining the $Cr_2O_3$ level of a catalyst by feeding a dilute solution of $H_2CrO_4$ into a regeneration stream of steam and air, in a quantity sufficient to compensate for the loss of chromium as $CrO_3$.

The use of $Cr_2O_3$-containing catalysts for oxidizing hydrocarbons and particularly for dehydrogenating alkanes to a mixture of alkenes and alkadienes; alkenes to alkadienes and alkyl aromatic to alkene aromatic hydrocarbons is well known. After certain periods of use the catalysts all require regeneration, which is usually effected by passing a mixture of steam and an oxygen-containing gas, such as air, through a bed of the catalyst for varying periods of time at temperatures of from about 400 to about 750° C. During the regenerative step some of the $Cr_2O_3$ originally present in the catalyst is converted to $CrO_3$, which volatilizes and is removed from the reactor with the effluent. Continued on-stream and regeneration cycles reduces the $Cr_2O_3$ content of the catalyst to the point where there is little or no noticeable catalysis-promoting effect. In addition, after each regenerating cycle, the change in composition of the catalyst requires an adjustment of operating conditions to obtain satisfactory conversions and yields of the desired unsaturated hydrocarbons. Eventually, regeneration of the catalyst fails to bring its dehydrogenating activity to an acceptable level in a reasonable period of time and then it is replaced with fresh catalyst. Therefore, a method for maintaining the chormium oxide content of the dehydrogeneation catalyst at or about the optimum level is needed.

An object of this invention is the provision of a method for maintaining the chromium oxide content of a hydrocarbon dehydrogenation catalyst at approximately an optimum level. Another object is the provision of a method of compensating for chromic oxide losses from a hydrocarbon dehydrogenation catalyst. Still another object is the provision of a method for promoting removal of carbonaceous deposits from a hydrocarbon dehydrogenation catalyst, while at the same time maintaining the chromium oxide content in the proper oxidation state for improving the catalyst dehydrogenating activity.

These objects are attained by feeding $H_2CrO_4$ into the catalyst chamber so that it contacts the catalyst and is deposited and/or adsorbed thereon as $CrO_3$. The $H_2CrO_4$ can be sprayed into the catalyst chamber, separately, as a solution in water or it can be added with the gaseous oxygen-containing stream, or the stream or a mixture thereof. Preferably, the $H_2CrO_4$ is sprayed as a dilute aqueous solution, countercurrently, as part of a superheated mixture of steam and air, which is fed into a reacter at a temperature of 500–700° C., usually about 600–650° C. When operating in this manner the dilute solution of $H_2CrO_4$ forms a vapor and finely divided $CrO_3$ which deposits or absorbs on the catalyst. The amount of $H_2CrO_4$ added need not be great. Usually from about .05 to .25 lb. of $CrO_3$ in water per 1,000 cubic ft. of catalyst is adequate and the preferred amount of $CrO_3$ is from about .1 to .15 lb. for the given volume of catalyst. The $CrO_3$ is converted to $Cr_2O_3$ either by reaction with carbonaceous deposits on the catalyst during the regeneration cycle or by reaction with the $H_2$ present in the reactor during the dehydrogenation cycle.

In the vapor phase dehydrogenation of aliphatic hydrocarbons, particularly the $C_4$–$C_{12}$ alkanes to form a mixture of alkenes and alkadienes or alkenes to form alkadienes, or alkyl aromatic to alkene aromatic hydrocarbons, especially, $C_4$ to $C_6$ alkenes, which are dehydrogenated to their respective conjugated dienes, such as butadiene from n-butenes, isoprene from 2-methylbutenes, and 2,3-dimethyl butadiene from 2,3-dimethyl butenes, and ethyl benzene which is dehydrogenated to styrene, the catalyst becomes coated with carbon or tarry material. To minimize the effect of the deposit, the dehydrogenation reaction is run for a period of time and then the hydrocarbon feed is shut off and an oxygen containing gas is fed into the reactor, during a regenerating cycle, at the temperature prescribed. This latter cycle serves to burn the carbon and vaporize or burn tarry materials from the catalyst. This regeneration step also converts some of the $Cr_2O_3$ in the catalyst to $CrO_3$. Some of all the $CrO_3$ vaporizes and is removed from the reactor with the effluent. The addition of $H_2CrO_4$ during the catalyst regeneration step serves not only to replace the $CrO_3$ lost by vaporization, it aids in the oxidation of the carbonaceous materials on the catalyst during which at least a portion of the $CrO_3$ is converted to $Cr_2O_3$. A further reason for adding the $H_2CrO_4$ is that no deleterious materials or catalyst poisons are added, since dehydration of the acid will result in the formation of pure $CrO_3$.

The catalyst in which the $Cr_2O_3$ content can be maintained in accordance with the invention include $Cr_2O_3$ on alumina, silica or silicate carriers, those containing As, Bi and Mo oxides; Bi, Fe and W oxides; Bi and Fe phosphates; Ca–Ni phosphates in which the Ca–Ni ratio is 6–12 to 1, Sr–Ni phosphates in which the Sr–Ni ratio is 4–12 to 1, and other catalysts containing metal atoms of Groups I–A, I–B, II–A, II–B, III–B, IV–A, IV–B, V–A, V–B, VI–B, VII–B, VIII, the lanthanum series elements, thorium, uranium, and mixtures thereof. The metal atoms of the groups of elements mentioned above can be present in the form of oxides, hydroxides or salts, or compounds which can be converted to the metal atom containing catalysts. Specific examples are potassium oxide, magnesium oxide, lanthanum oxide, titanium dioxide, vanadium pentoxide, manganese dioxide, ferric oxide, cobalt oxide, nickel phosphate, copper phosphate, zinc phosphate, tin phosphate, and bismuth oxide.

The example which follows is intended to illustrate the invention, not to limit it. All parts are by weight unless otherwise specifically indicated.

A Ca-Ni-phosphate catalyst containing about 8 atoms of Ca per atom of Ni was prepared by simultaneously blending an aqueous solution of the requisite quantity of $CaCl_2$ and $Ni(NO_3)_2$ with an aqueous diammonium phosphate solution. The mixture was kept at a pH of 7–8.1 during this blending step. The precipitated catalyst was washed with water until free of chloride ions. Then this Ca-Ni-phosphate was dried, comminuted, blended with about 1% $Cr_2O_3$ and about 2% graphite and formed into pellets. The pellets were thereafter heated in air to burn away the graphite. More detailed directions for preparing the catalyst are found in U.S. Pat. 2,542,813.

The catalyst was used for dehydrogenating n-butene-1 by the technique described above. Regeneration was effected about every 30 minutes by passing a mixture of steam and air preheated to 620° C. through the catalyst. A solution containing 0.1 lbs. of $H_2CrO_4$ was sprayed into the catalyst chamber, countercurrently, to the steam-air mixture, during the regeneration step. The countercurrent feeding of the $H_2CrO_4$ is not essential, but it aids in obtaining a more thorough mixing and distribution of the $H_2CrO_4$ throughout the regeneration stream.

Regeneration was considered complete when no $CO_2$ was found in the gaseous effluent from the reactor. It was found that the addition of $H_2CrO_4$ during the regeneration step materially reduced the time required until the effluent was free of $CO_2$. It was also found that on starting the dehydrogenation cycles, the desired conversion of butene to butadiene could be maintained at a lower temperature than is usually the case with catalyst regenerated several times by procedures employed heretofore. Analysis of the catalyst shows that the $Cr_2O_3$ content after serveral dehydrogenation and regeneration cycles was still within the most desirable range.

Although I have exemplified the invention with Ca-Ni-phosphate catalyst it is to be understood that any dehydrogenation catalyst can have its chromium oxide content maintained at its most desirable level by the procedure here described.

I claim:

1. A method of maintaining the chromium oxide content of a dehydrogenation catalyst containing $Cr_2O_3$ comprising adding sufficient aqueous $H_2CrO_4$ during a steam-oxygen containing gas regeneration step to a chamber containing said catalyst to provide a predetermined amount of $Cr_2O_3$ while maintaining the temperature in said chamber at a temperature of from about 500–700° C.

2. The process of claim 1 in which the $H_2CrO_4$ in dilute aqueous solution is sprayed into the said chamber.

3. The process of claim 2 in which the $H_2CrO_4$ is added to a stream of air and steam prior to entering of said stream into said chamber.

4. The method of claim 1 in which the amount of $H_2CrO_4$ added is in the range of from about .05 to about .25 pound per 1,000 cubic feet of catalyst volume.

5. The method of claim 4 in which the amount of $H_2CrO_4$ is from about .1 to about .15 pound per 1,000 cubic feet of catalyst volume.

6. The method of claim 1 in which the catalyst is a Ca-Ni-Po$_4$ double salt admixed with $Cr_2O_3$ useful for dehydrogenating mono-olefins having at least 4 carbon atoms to dienes of the same number of carbon atoms.

7. The method of claim 1 in which the catalyst is $Cr_2O_3$ on an alumina support.

References Cited

UNITED STATES PATENTS

| | | | |
|---|---|---|---|
| 2,014,503 | 9/1935 | Nutting | 252—413 |
| 2,184,235 | 12/1939 | Groll et al. | 252—465 |
| 2,542,813 | 2/1951 | Heath | 252—437 |
| 3,198,846 | 7/1965 | Kelso | 260—674 |
| 3,327,010 | 6/1967 | Noddings et al. | 252—437 |
| 3,327,012 | 6/1967 | Noddings et al. | 252—437 |

DANIEL E. WYMAN, Primary Examiner

P. E. KONOPA, Assistant Examiner

U.S. Cl. X.R.

252—420, 413; 260—680